US010268514B1

(12) United States Patent
Kesarwani

(10) Patent No.: US 10,268,514 B1
(45) Date of Patent: Apr. 23, 2019

(54) PERFORMANCE ANALYSIS OF STATELESS COMPUTE FUNCTIONS USING FUNCTION CALL INTERCEPT

(71) Applicant: Amazon Technologies, Inc., Seattle, WA (US)

(72) Inventor: Nitin Kesarwani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 15/077,779

(22) Filed: Mar. 22, 2016

(51) Int. Cl.
| G06F 9/46 | (2006.01) |
| G06F 9/50 | (2006.01) |
| G06F 11/34 | (2006.01) |
| G06F 11/30 | (2006.01) |

(52) U.S. Cl.
CPC ........ G06F 9/5011 (2013.01); G06F 11/3024 (2013.01); G06F 11/3414 (2013.01)

(58) Field of Classification Search
None
See application file for complete search history.

(56) References Cited

U.S. PATENT DOCUMENTS

| 7,739,689 | B1 * | 6/2010 | Spertus | G06F 9/4425 717/130 |
| 9,158,604 | B1 * | 10/2015 | Christodorescu | G06F 9/54 |
| 9,256,467 | B1 * | 2/2016 | Singh | G06F 9/5055 |
| 9,559,928 | B1 * | 1/2017 | Porter | G06F 11/3612 |
| 9,634,920 | B1 * | 4/2017 | Goldberg | H04L 43/10 |
| 2002/0152305 | A1 * | 10/2002 | Jackson | H04L 43/00 709/224 |
| 2002/0194251 | A1 * | 12/2002 | Richter | G06F 9/5011 718/105 |
| 2004/0025165 | A1 * | 2/2004 | Desoli | G06F 9/54 719/310 |
| 2015/0378864 | A1 * | 12/2015 | Lensmar | G06F 8/53 717/130 |
| 2017/0153962 | A1 * | 6/2017 | Biegun | G06F 11/3409 |

OTHER PUBLICATIONS

Hanwu et al. "Research on Multi-Agent Container Terminal Logistics Operation Scheduling System Based on TOC", 2010 IEEE, pp. 213-216.*
Zubok et al. "Multi-Agent Approach to the Monitoring of Cloud Computing System with Dynamically Changing Configuration", 2016 IEEE, pp. 410-416.*

* cited by examiner

Primary Examiner — Van H Nguyen
(74) Attorney, Agent, or Firm — Davis Wright Tremaine LLP

(57) ABSTRACT

Techniques for acquiring performance analysis metrics for computer-implemented functions are described herein. A computer-implemented function is instantiated on a computer system. A monitoring agent running on the computer system monitors outbound calls from the computer-implemented function and, when an outbound function call is intercepted, the agent calculates a performance metric for the outbound function. An aggregated set of performance metrics is produced, and that aggregated set of performance metrics is presented for further analysis.

20 Claims, 10 Drawing Sheets

PERFORMANCE ANALYSIS OF STATELESS COMPUTE FUNCTIONS USING FUNCTION CALL INTERCEPT

BACKGROUND

Modern computing services are frequently provided to users and customers as collections of remote services, with virtual machine services, remote data storage, and computation services. Such services are offered by computing resource service providers to customers and are configurable and scalable as needed. Allowing customers to purchase only needed resources can allow customers to reduce expenses and overhead associated with maintaining computer hardware and other computing system resources. Nonetheless, it can be difficult for customers to fully predict computational needs, particularly when such customers' needs involve a large number of relatively lightweight resources and/or when such resource needs vary widely over the course of a business day. Provisioning a full virtual machine instance to handle a simple computation task can be time consuming and inefficient, leading to a delay in receiving the result of such a task, causing a degraded customer experience.

BRIEF DESCRIPTION OF THE DRAWINGS

Various techniques will be described with reference to the drawings, in which.

DETAILED DESCRIPTION

Figure 1:
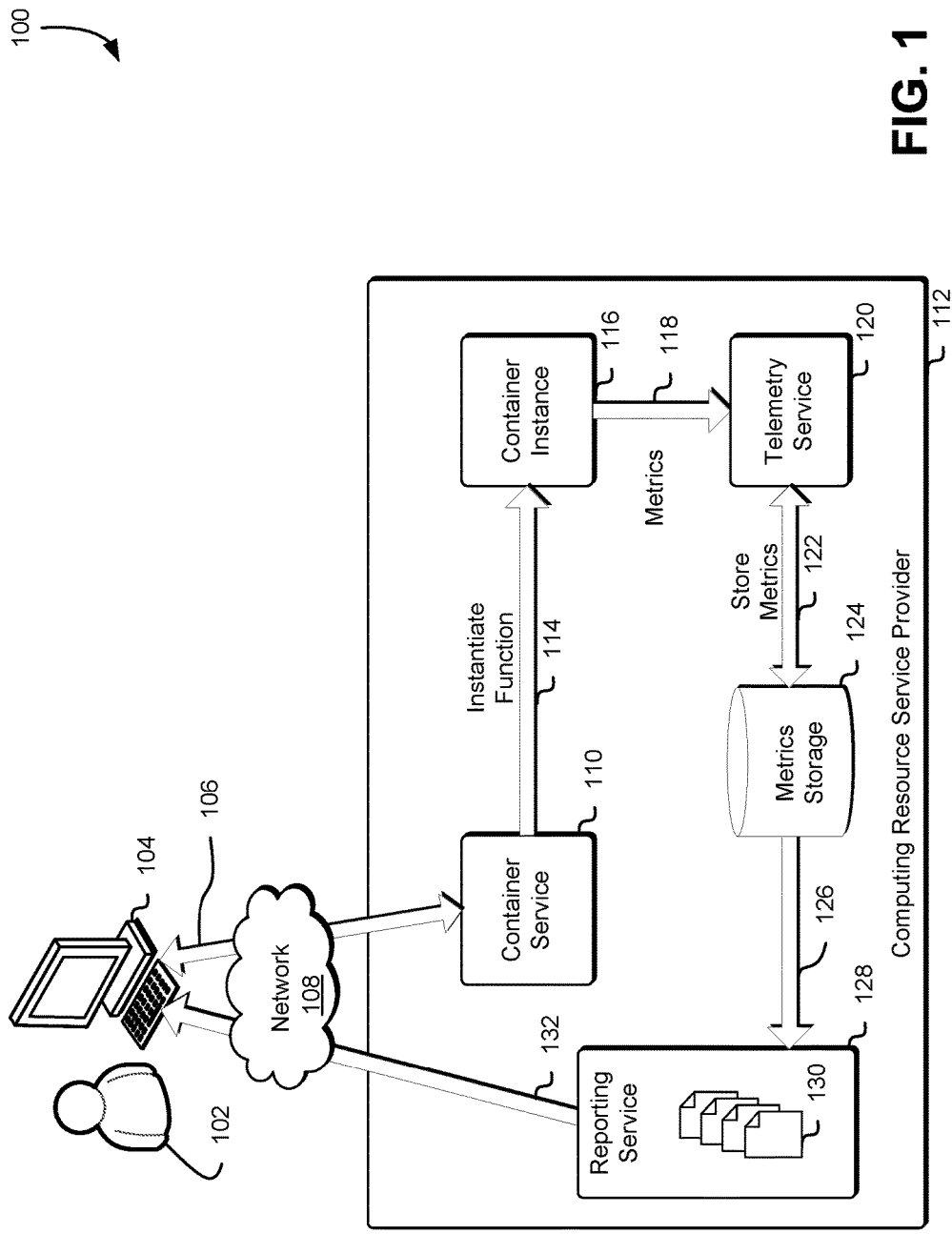
FIG. 1 illustrates an example environment where metrics are gathered from a stateless compute function.

This disclosure relates to generating and analyzing performance metrics for stateless compute functions. A stateless compute function is a function that has a functional definition, but no persistent state. In a stateless compute function, the functionality is defined so that the actions associated with the function may be performed without maintaining an internal state of the function. Stateless compute functions may be useful for users and customers of computing resource service provider systems for several reasons. For example, stateless compute functions may typically be executed in parallel. Because there is no state associated with the function, there is no risk of resource collisions associated with such a state. Stateless compute functions may also be very scalable for the same reason. A user or customer may implement a transaction using stateless compute functions and, because there is a no persistent state associated with those functions, may execute dozens, hundreds, thousands, or millions of such transactions without significant risk of resource collision and without significant costs associated with maintaining the persistent state of each transaction.

In an example, consider a simple transaction to pay money from a first user to a second user. The transaction would be initialized with the payer's account (i.e., the account of the person paying), the payee's account (i.e., the account of the person being paid), and the amount to be paid. The transaction may be implemented with three function calls. The first function call would be to deduct the amount from the payer's account. The second function call would be to add the amount to the payee's account. The third function call would be to notify the payer and the payee of the transaction. If each of these function calls are stateless, they can be performed in any arbitrary order, can be performed in parallel, and can be just one transaction of a large number of transactions. For example, the net result of first notifying the payer and the payee, then crediting the payee's account, and then debiting the payer's account is the same as the net result of debiting the payer's account, notifying the payee and the payer, and crediting the payee's account. Similarly, the net result of having a first transaction to pay $100 from account A to account B, a second transaction to pay $300 from account B to account C, to pay $500 from account C to account A, and to pay $200 from account C to account B is the same, regardless of the order in which the transactions are executed. It should be noted that the example stateless compute function used herein (e.g., that of a banking transaction) is merely an illustrative example of the type of function that may be implemented using stateless compute functions.

However, the nature of stateless compute functions and the arbitrary order in which they may be executed can make it difficult to gather performance metrics on such functions. Performance metrics are data and/or metadata associated with computer-implemented functions that help customers and providers determine the overall quality and performance of the function. A canonical example of a performance metric is the time taken to execute the function or the individual steps of a function. Performance metrics are useful for analyzing function performance to determine whether a particular function is performing as expected or to determine whether a particular step of a function is suddenly taking a greatly increased amount of time to complete. Such performance metrics can be vitally important in systems or services that require real time performance. Using the above example, a banking system where each transaction takes, for example, less than a second has a great deal of utility and may thus provide a great deal of confidence as to the security of such a system. Conversely, a banking system where each transaction takes, for example, a minute or more may have considerably less utility. In such a slow system, hundreds or even thousands of transactions can be initiated to, for example, debit $100 from a user's account in the time it takes the first transaction to complete.

Performance metrics may be difficult to gather from stateless compute functions because, with no internal state, there is no way for a telemetry service to directly monitor the function for state changes. Accordingly, there may be no simple way to determine at what time and under what circumstances execution time sudden or unexpected increases in execution times may occur. Directly instrumenting the stateless compute function to provide such telemetry data and/or metadata may be cumbersome and may also erode a considerable amount of the advantages to using such stateless compute functions.

As stated above, this disclosure relates to techniques for generating and analyzing performance metrics for stateless compute functions without resorting to directly instrumenting the stateless compute functions. A stateless compute function may be implemented as a series of stateless compute function calls. Because a stateless compute function has a call and a response, each of the stateless function calls has, from the perspective an external observer, three quasi-states (i.e., these are not states of the stateless compute function call itself). The first of these is before the function call has been made, the second is while waiting for the response, and the third is after the response is received. Using such quasi-states, calls from the computer system that executes the stateless compute function may be monitored to determine when the function call has been made and return results to the computer system that executes the stateless compute function may be monitored to determine when the response is received.

Using the above example of the banking transaction to pay an amount from a first account to a second account, the computer system that executes the transaction can be monitored by an external agent configured for monitoring the stateless compute function. When the first function call is sent out from the computer system, the time of that outbound function call may be noted by monitoring the outbound communications from the compute function. The agent, configured to monitor outbound communications and/or to monitor a compute function may detect the compute function based on, for example, a signature associated with the function. Then, when a response to that first function call is received, the time of that response may also be noted. From these two times, the elapsed time for the outbound first function can be determined and the call time, the response time, and/or the elapsed time may be sent to a telemetry system or service. It should be noted that using this approach of monitoring outbound calls from the computer system that executes the transaction and monitoring the responses received provides performance metrics without altering the stateless compute function.

Additional performance metrics may also be gathered in association with stateless compute functions. For example, a stateless compute function may be implemented in a container hosted on a container instance (both described below). In such an implementation, the stateless compute function is instantiated in the container, the function is executed (e.g., the function to perform the banking transaction described above) using the container, and after execution is complete, the container of the compute function is torn down. In addition to gathering performance metrics on the function calls as described above, it may also be useful to gather performance metrics on the amount of time between instantiation and teardown, between instantiation and the first function call, between the last response and teardown, or between other such events. By monitoring outbound function calls from the container and/or from the container service, these additional performance metrics may be gathered.

By gathering performance metrics for stateless compute functions and providing them to users and/or administrators of computer systems provided by a computing resource service provider, a sudden change in performance of such functions may be analyzed and any bottlenecks determined. For example, if the banking transaction described above typically takes 100 milliseconds ("ms") to complete, but that number suddenly jumps to 500 ms, the performance metrics gathered using the techniques described may be used to determine where the sudden increase in time has occurred. It may be, for example, that the notification function starts taking a considerably increased time because of changes to a notification service. In such a case, the notification may simply be removed from the transaction and moved to a separate transaction to avoid bottlenecking the time critical parts of the transaction.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where metrics are gathered from a stateless compute function in accordance with an embodiment. A user 102 may use a client computing device 104 to connect 106 to a container service 110 provided by a computing resource service provider 112. The user 102 may use the client computing device 104 to connect 106 to the container service 110 over a network 108 such as those networks described herein. The computing resource service provider 112 may, for example, provide a distributed, virtualized, and/or datacenter environment within which one or more applications, processes, services, virtual machines, and/or other such computer system entities may be executed. The user 102 may be a person, or may be a process running on one or more remote computer systems, or may be some other computer system entity, user, or process.

Commands from the user 102 to the computing resource service provider 112 may originate from an outside computer system or from within the computing resource service provider environment. The commands to connect 106 to the computing resource service provider 112 may be sent to the container service 110, without the intervention of the user 102 (i.e., commands to connect 106 to the container service 110 may be generated automatically in response to one or more events). The user 102 may be a customer of the computing resource service provider 112. The user 102 may also be a privileged user associated with a customer of the computing resource service provider 112. The user 102 may also be a privileged user associated with the computing resource service provider 112.

The computing resource service provider 112 may provide access to one or more host machines, as well as provide access one or more services as may be operating thereon. One or more services provided by the computing resource service provider 112 may also be implemented as and/or may utilize one or more virtual machine instances as may be operating on the host machines. For example, the computing resource service provider 112 may provide a variety of services to users including, but not limited to, virtual machine services, block-level storage services, container services, or database services. The user 102 may communicate with the computing resource service provider 112 via an interface such as a web services interface or any other type of interface. While the example environment illustrated in FIG. 1 shows a single connection or interface from the client computing device 104 to the computing resource service provider 112, each of the services may have its own interface and, generally, subsets of the services may have corresponding interfaces in addition to or as an alternative to the single interface.

In an example, a service may be a collection of computing resources configured to instantiate container instances. The service (e.g., the container service 110) may be configured to instantiate container instances on behalf of a customer such as the user 102. The user 102 may interact with the container service 110 using appropriately configured and authenticated application programming interface ("API") requests to instantiate container instances on physical computing devices (or on virtualizations thereof) hosted and operated by the computing resource service provider 112. The container service 110 may also be configured to manage container instances to, for example, instantiate container instances and/or to manage containers on the container instances as described below. The container instances may be used for various purposes, such as to perform transactions, to operate business applications or, generally, to serve as computing power for the customer. Other applications for the container instances may be to support database applications, electronic commerce applications, business applications, and/or other applications using the stateless compute functions described herein.

As used herein, a stateless compute function is a function that may be executed on a computer system, which does not include a persistent state. In other words, in a stateless compute function, the functionality is defined so that the actions associated with the function may be performed without maintaining an internal state of the function. In this sense, the state is said to be ephemeral. Stateless compute function programming methods involve writing functions so that they have no side effect other than the effect of function call. As an example, a simple function to add a list of numbers together and to return that result may be implemented by setting an initial value to zero and parsing through the list, adding each number in the list to the initial value, and then returning that sum. Such an implementation has persistent state associated with the state of the sum (i.e., whether the initial value has been set, after the first addition, after the second addition, etc.). Conversely, with a stateless compute function to perform the same functionality, there is no persistent state associated with the summation of the list. A stateless compute function computes the result directly with no internal state of the function. That is, as a result of calling the stateless compute function, there is a call and a response, with no persistent state of the function to be maintained.

The user 102 may connect 106 with the container service 110 via the network 108 and may issue commands to instantiate 114 a stateless compute function using a container of a container instance 116 (described below). As the stateless compute function executes, metrics 118 may be gathered from the container instance 116 and provided to a telemetry service 120 for processing and analysis. The metrics 118 may be gathered from the container instance 116 and provided to a telemetry service 120 using an agent running on the container instance 116, or may be gathered from the container instance using an agent associated with, but not running on, the container instance 116.

For example, the agent may be configured to collect telemetry data, such as a set of performance metrics and to provide such telemetry data to the telemetry service 120. The telemetry service 120 may be configured to aggregate such data received from the agent for a resource monitoring service of the computing resource service provider 112. A resource monitoring service, although not illustrated in FIG. 1, is a service provided by the computing resource service provider 112 that is configured to monitor one or more computing resources and to generate an alarm if such resources fall above or below a determined threshold. For example, the resource monitoring service of the computing resource service provider 112 may be configured to monitor the execution time of a stateless compute function such as those described herein and to trigger an alarm if the execution time exceeds a determined threshold value.

As described above, the resource monitoring service of the computing resource service provider 112 in turn may be configured to trigger an alarm or take some other action based on the metrics 118 provided to the telemetry service 120. For example, if the agent provides a performance metric from a stateless compute function from a container to the telemetry service 120 that exceeds a threshold value, the telemetry service 120 may provide an error state to the resource monitoring service, which may react by triggering an alarm notifying the user 102 that the stateless compute function has experienced an error. In another example, the resource monitoring service may trigger an alarm if one of the performance metrics provided to and/or computed by the telemetry service 120 exceeds a threshold. In some embodiments, the telemetry service 120 may be configured to specify alarm conditions and thresholds upon which to base such alarms. Examples of triggering an alarm include, but are not limited to, providing a text message to the user 102 associated with the compute function, e-mailing the user, and/or displaying a visual indicator (e.g., a red icon, popup window, etc.) on an interface displaying compute function statuses.

It should be noted that while the examples illustrated herein are described in terms of performance metrics (i.e., in terms of elapsed execution times) other metrics may be gathered by the agent and provided to the telemetry service. For example, the agent on the container instance 116 may gather metrics about central processing unit ("CPU") usage, about network bandwidth consumed, about memory used, about resource accesses and/or resource access failure, or about other such metrics.

After the metrics 118 have been gathered by the agent associated with the container instance 116 and provided to the telemetry service, the metrics may be stored 122 in metrics storage 124 for additional processing and analysis. In the example illustrated in FIG. 1, the metrics in metrics storage 124 may be provided 126 to a reporting service 128. The reporting service 128 may use the data to generate one or more reports 130 and provide 132 those reports to the user 102. The reports 130, described in more detail below, may include summaries of performance metrics and/or other such metrics, and may also highlight instances where those metrics may have exceeded threshold values.

Figure 2:
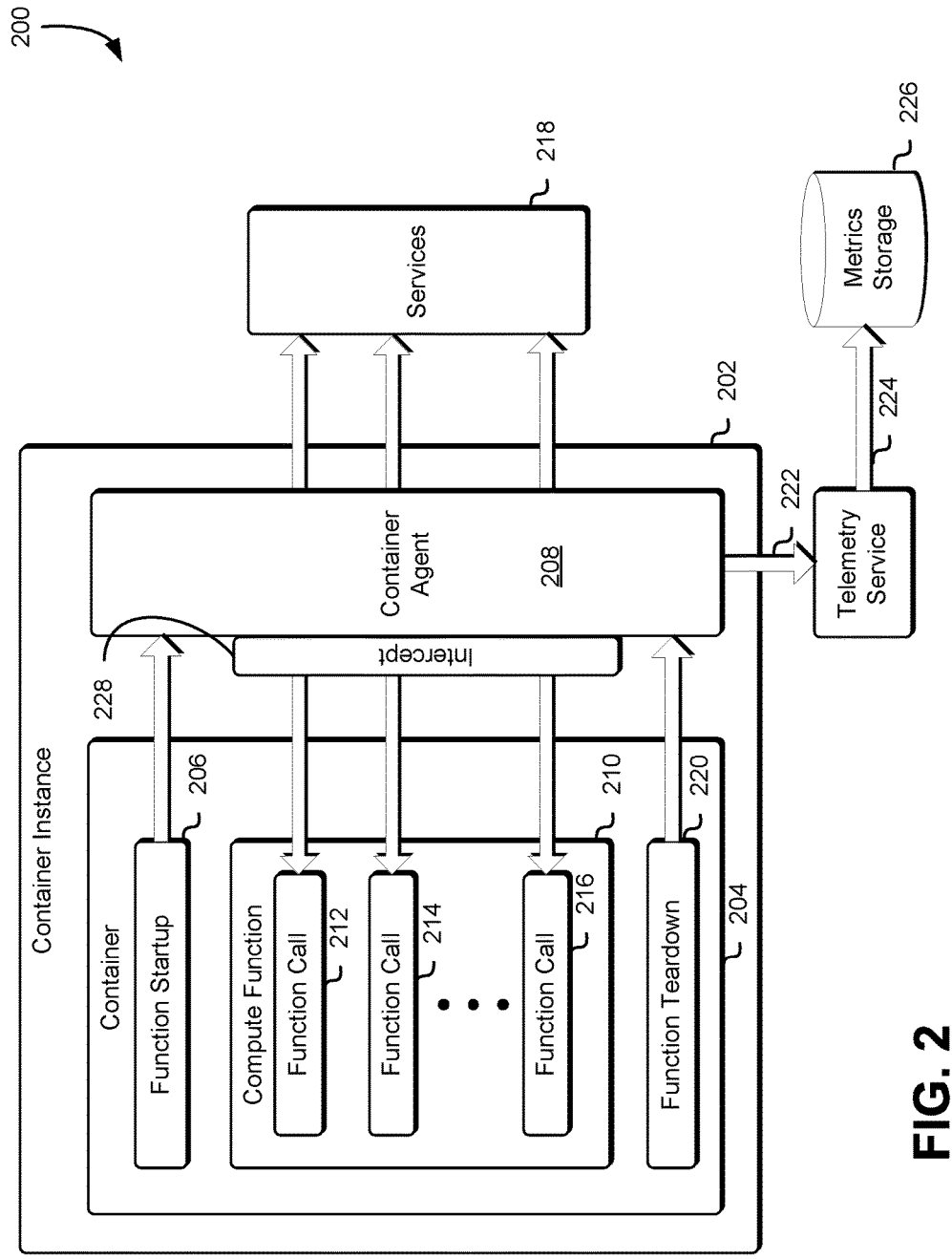
FIG. 2 illustrates an example environment where an agent gathers and reports metrics from a stateless compute function.

FIG. 2 illustrates an example environment 200 where an agent gathers and reports metrics from a stateless compute function as described in connection with FIG. 1 and in accordance with an embodiment. In the example illustrated in FIG. 2, a container instance 202 includes one or more containers such as the container 204 and one or more agents such as the container agent 208. When a compute function 210 is instantiated in a container 204 of the container instance, the function startup call 206 may occur first. The function startup call 206 may be detected by monitoring the container 204 using the container agent 208. The container agent 208 may intercept 228 the function calls by, for example, monitoring outbound communications from the container to detect function calls. It should be noted that, as used herein, causing a container agent such as a container agent 208 to "intercept" means that access one or more communications channels between the container and the external services is obtained, and any function calls that are processed using those communications channels are recorded and processed for metrics as described herein. Neither the function calls nor any responses to those function calls are necessarily (but may be, in some embodiments) altered, re-routed, blocked, or otherwise changed in intercepting the function calls.

As described above, the container agent 208 may intercept 228 the function calls without any alterations to the function calls because the container agent is configured to monitor communications between the container (and, for example, any applications or functions executing thereon) and any external services. For example, if a function call within a container makes a call to a database service to store data, the container agent may intercept that call because the container agent is an interface between the container and any resources or services outside the container instance. It is important to note that the container 204 may be one of a plurality of containers on the container instance 202, which may be monitored by the container agent 208, as described below.

In addition to the container agent monitoring communications by intercepting function calls, the container agent may also be configured to directly receive notifications of event. For example, the function startup call 206 may be detected by implementing monitoring functionality in the software development kit ("SDK") associated with the container service, by implementing monitoring functionality in the API used to access the container service, or by implementing monitoring functionality in a library of functionality associated with the container service. Such monitoring functionality may be configured to send event notifications directly to the container agent, as illustrated in FIG. 2.

For example, an API call to instantiate the compute function 210 in the container 204 of the container instance 202 may be augmented with monitoring functionality to notify the container agent 208 of an event associated with the instantiation. The event may specify an identifier associated with the compute function (e.g., a name of the compute function or a universal unique identifier ("UUID") associated with the compute function), an identifier associated with the container, an identifier associated with the container instance, an identifier associated with the event (e.g., the event associated with the function startup call), and/or a time stamp associated with the instantiation. One or more identifiers and time stamps may be concatenated or otherwise combined to produce a unique identifier associated with the event, thereby reducing the likelihood of duplicate events. The container agent 208 may then notify 222 the telemetry service 224 of the event and the telemetry service 224 may extract the metrics data from the event (e.g., the time of the function startup call 206) and provide that metrics data to metrics storage 226 as described above.

The compute function 210, once instantiated, may then begin execution. In the example illustrated in FIG. 2, the compute function 210 issues a first function call 212 (i.e., a stateless compute function call) to a service of one or more services 218. The one or more services 218 may be services provided by a computing resource service provide and may, for example, provide resources to the compute function. For example, one of the one or more services 218 may be a database service configured to provide database storage for use by users of the computing resource service provider. The first function call 212 may be a call to store data in a database using the database service. As illustrated in FIG. 2, the first function call 212 is an outbound call from the container 204. Because outbound function calls from the container 204 may be monitored by the container agent 208 as described herein, the container agent 208 may monitor the first function call 212 to the database service, may generate an event associated with the first function call 212, and may notify 222 the telemetry service 224 of the event as described above.

When the container agent 208 generates the event associated with the first function call 212, the container agent 208 may also begin monitoring communications between the container 204 and the one or more services 218 for a response to the first function call 212. Using the example described above, where the first function call 212 is a call to a database service, the container agent 208 may then monitor communications between the database service and the container 204 for a response to the first function call 212 that corresponds to the first function call 212. The container agent 208 may, for example, monitor the communications for a response with an identifier associated with and/or conforming to the identifier of the first function call 212. The response to the first function call 212 may indicate success, may indicate failure, may indicate an error, may return a result, or may include some other response. For example, a response to a function call that performs an action may simply be an indicator of success, an indicator of failure, or an indicator of an error. Conversely, a response to a function call that returns a result may include that result. As a result of monitoring for the response, the container agent 208 may also generate an event associated with the response to the first function call 212, and may notify 222 the telemetry service 224 of the event as described above.

As the stateless compute function continues, additional function calls such as function call 214 and function call 216 may be executed. Again, because outbound calls from the container 204 may be monitored by the container agent 208, the container agent 208 may monitor the function call 214 and the function call 216, may generate events associated with the function call 214 and the function call 216, and may notify 222 the telemetry service 224 of the events as described above. Similarly, when the container agent 208 generates the events associated with the function call 214 and the function call 216, the container agent 208 may begin monitoring communications between the container 204 and the one or more services 218 for a response to the function calls. Additionally, as a result of monitoring for the responses to the function calls, the container agent 208 may generate events associated with the response to the function call 214 and the function call 216, and may notify 222 the telemetry service 224 of the events as described above.

When the compute function 210 finishes, additional metrics data may be gathered. In the example illustrated in FIG. 2, an API call to teardown the compute function 210 in the container 204 of the container instance 202 may be augmented with monitoring functionality to notify the container agent 208 of an event associated with the teardown. As used herein, "teardown" refers to removing the container 204 from the container instance 202 and/or cleaning up and resources associated with the container. As with the function startup call described above, the event may specify an identifier associated with the compute function (e.g., a name of the compute function or a universal unique identifier ("UUID") associated with the compute function), an identifier associated with the container, an identifier associated with the container instance, an identifier associated with the event (e.g., an event associated with the function teardown call 220), and/or a time stamp associated with the teardown and one or more identifiers and time stamps may be concatenated or otherwise combined to produce a unique identifier associated with the event. The container agent 208 may then notify 222 the telemetry service 224 of the event and the telemetry service 224 may extract the metrics data from the event (e.g., the time of the function teardown call 220) and provide that metrics data to metrics storage 226 as described above.

Figure 3:
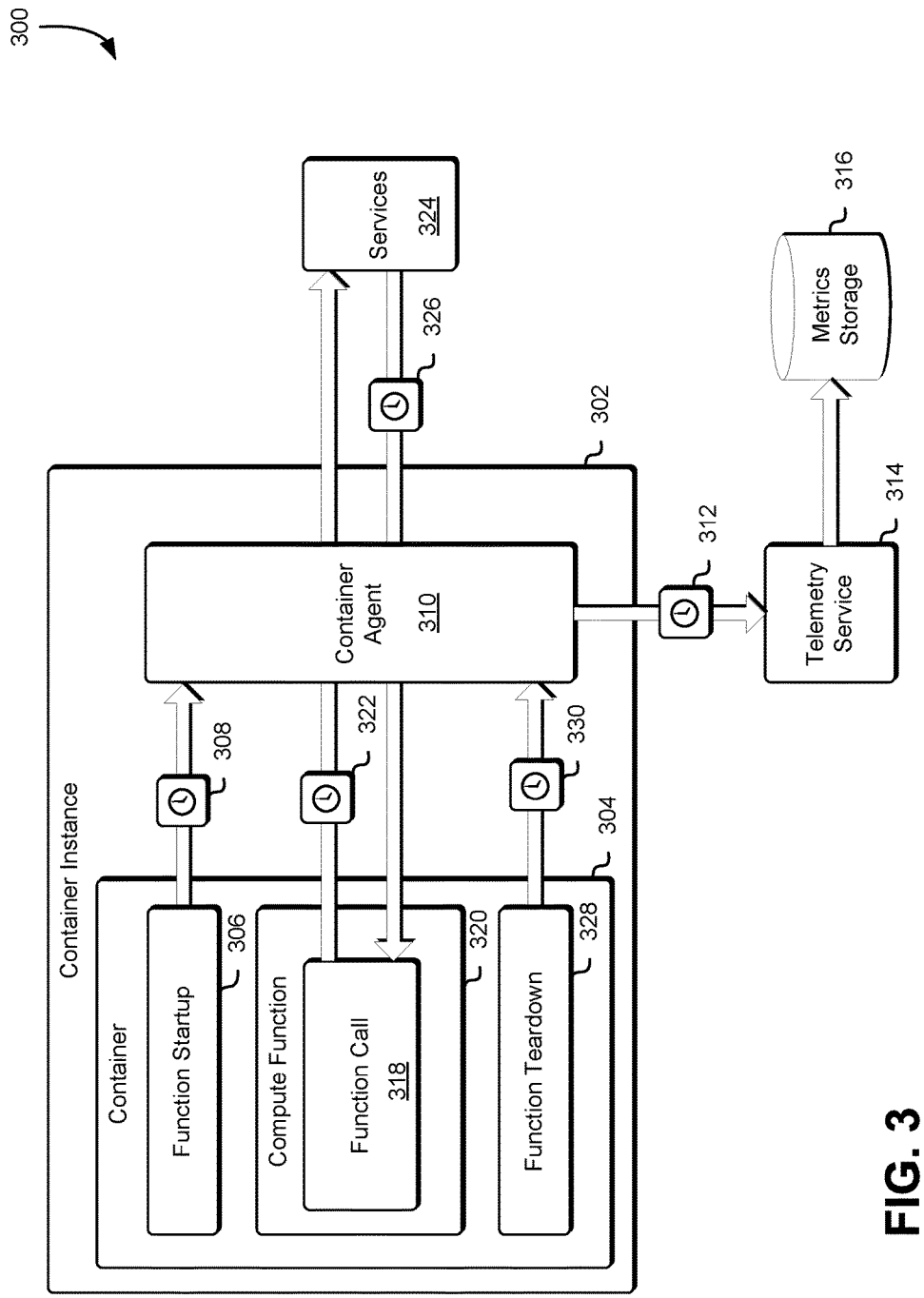
FIG. 3 illustrates an example environment where time-based metrics are gathered from a stateless compute function.

FIG. 3 illustrates an example environment 300 where time-based metrics are gathered from a stateless compute function as described in connection with FIG. 1 and in accordance with an embodiment. In the example illustrated in FIG. 3, a compute function 320 is instantiated in a container 304 of a container instance 302 as described above. The container instance 302 includes a container agent 310, also as described above. When the function instantiation or execution begins, the notification of an event with a time stamp 308 associated with the function startup call 306 is received by the container agent 310. The container agent 310 may then process the event to generate one or more time-based metrics 312 for the telemetry service 314. The one or more time-based metrics 312 may be further processed and/or analyzed by the telemetry service 314 and may also be stored in metrics storage 316 as described above.

For example, the notification of the event with a time stamp 308 associated with the function startup call 306 may include the name of the compute function 320, an identifier associated with the container 304, and a time stamp of the instantiation (e.g., a time and/or date when the compute function 320 is instantiated in the container 304). The container agent 310 may process the event to extract the time stamp and may generate a time-based metric (e.g., the time of the function startup call) using that time stamp. The time-based metric may then be provided to the telemetry service 314 for further processing and/or analysis. For example, the telemetry service may compare the time-based metric to an expected time as described below wherein the expected time includes an ideal time, an average time, a percentile of an average time, or some other expected time. Such analysis may include, but may not be limited to, storing the time of the function startup call locally so that it may be used to calculate an elapsed time for the compute function by comparing the time of the function startup call to the time of the function teardown call, as described below.

One or more function calls such as the function call 318 may then be executed within the container 304 as described above. In the example illustrated in FIG. 3, the function call 318 is a call to a service of one or more services 324. Each function call 318 may be analyzed by the container agent 310 to determine a time stamp 322 (i.e., the time when the function call is made) associated with the function call 318 by intercepting the function call 318 as described above. The container agent 310 may, in response to receiving a notification of the function call with a time stamp 322, then process the notification to generate one or more time-based metrics 312 for the telemetry service 314 that may be further processed and/or analyzed by the telemetry service 314 and that may also be stored in metrics storage 316 as described above.

When the function call 318 is detected by the container agent, the container agent may then begin monitoring the connection between the one or more services 324 and the container 304 for a response to the function call 318. When a response to the function call 318 is detected based on, for example, a conforming identifier, the response to the function call 318 may be analyzed by the container agent 310 to determine a function call response time stamp 326 (i.e., the time when the response to the function call is generated by the one or more services 324) by intercepting the response to the function call 3128 as described above. The container agent 310 may, in response to receiving the function call response time stamp 326, process the response to generate one or more time-based metrics. For example, the container agent 310 may compare the time-based metric of the function call with a time stamp 322 against the function call response time stamp 326 to calculate an elapsed time for the function call 318.

Finally, when the function terminates, a notification of an event with a time stamp 330 associated with the function teardown call 328 may be received by the container agent 310. The container agent 310 may then process the event to generate one or more time-based metrics 312 for the telemetry service 314. For example, the container agent 310 may compare the time-based metric of the function startup call 306 described above against the time stamp 330 associated with the function teardown call 328 to calculate a total elapsed time for the compute function 320. This total elapsed time may then be provided to the telemetry service 314 and/or stored in the metrics storage 316.

Figure 4:
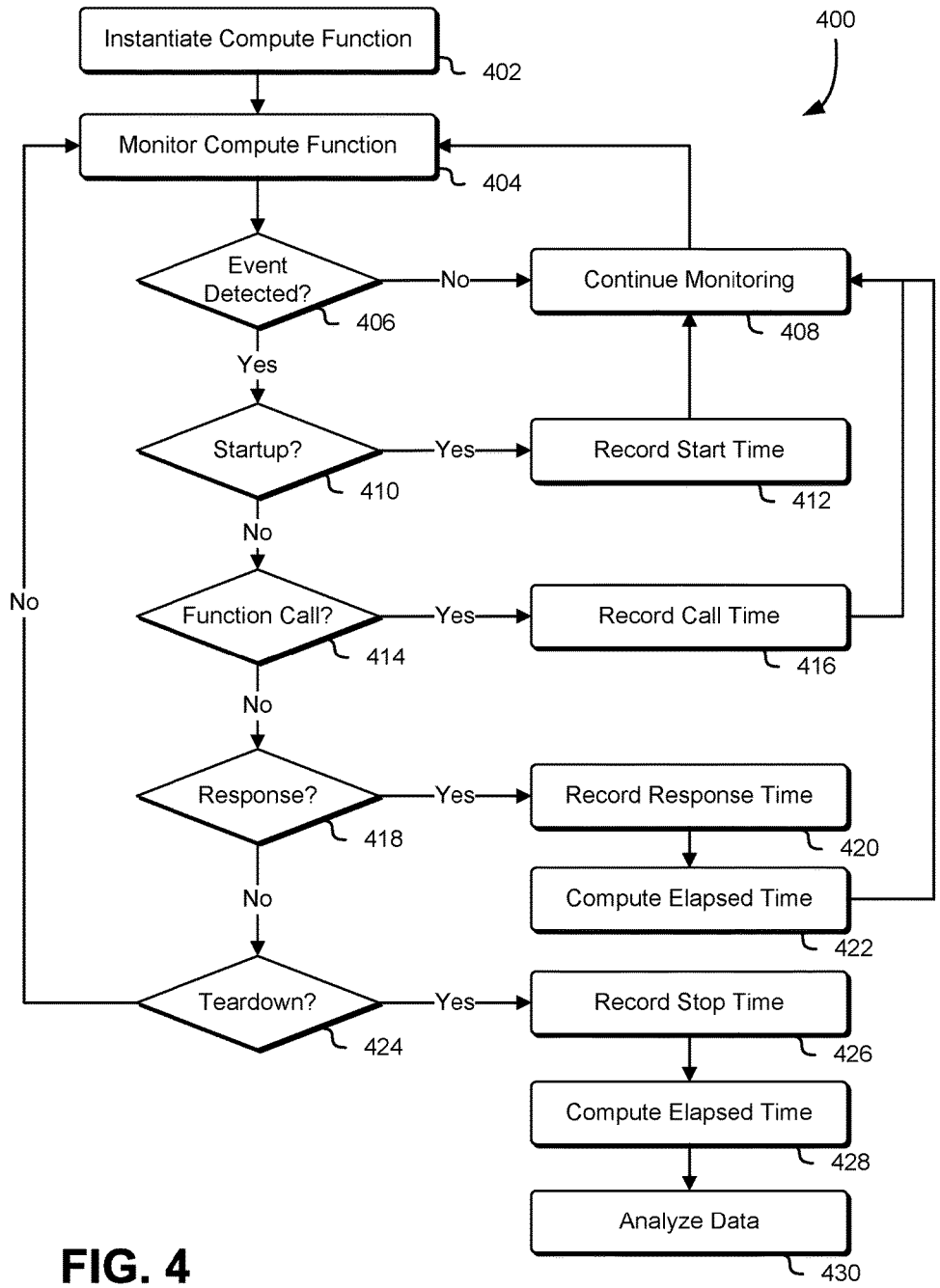
FIG. 4 illustrates an example process for gathering and analyzing time-based metrics from a stateless compute function.

FIG. 4 illustrates an example process 400 for gathering and analyzing time-based metrics from a stateless compute function as described in connection with FIG. 1 and in accordance with an embodiment. A container service such as the container service 110 described in connection with FIG. 1 may perform at least a part of the process illustrated in FIG. 4. A telemetry service such as the telemetry service 120 described in connection with FIG. 1 may also perform at least a part the process illustrated in FIG. 4. One or more container agents such as the container agent 208 described in connection with FIG. 2 may also perform at least a part of the process illustrated in FIG. 4.

First, a container service may instantiate 402 a stateless compute function in a container of a container instance. A container agent running on the container instance may then begin monitoring 404 the compute function by, for example, monitoring communications between the container and other services such as those that may be provided by a computing resource service provider. If it is not the case that the container agent detects 406 an event, the container agent may continue 408 to monitor the compute function by monitoring 404 the compute function as described herein.

If the container agent detects 406 an event by, for example, intercepting the event as described above, the container agent may first determine 410 whether the event is a startup event. A startup event is an event associated with instantiating and/or beginning execution of the compute function in the container. A startup event may be generated by a software library associated with the container, by an API call, by an SDK, or by some other such mechanism. If the container agent does determine 410 that the event is a startup event, the container agent may extract data and/or metadata from the event so that a telemetry service may record 412 the start time. The container agent may then continue 408 to monitor the compute function by monitoring 404 the compute function as described above.

Similarly, if the container agent detects 406 an event, the container agent may next determine 414 whether the event is an event associated with a function call from the compute function to a service or resource outside of the container (i.e., an outbound function call). An outbound function call from the compute function to a service or resource outside the container may be detected by monitoring communications that emerge from the container. If the container agent does determine 414 that the event is an event associated with a function call from the compute function to a service or resource outside of the container, the container agent may extract data and/or metadata from the event so that a telemetry service may record 416 the call time of the function call. The container agent may then continue 408 to monitor the compute function by monitoring 404 the compute function as described above.

If the container agent detects 406 an event, the container agent may next determine 418 whether the event is an event associated with a response to a previously detected outbound function call from the compute function to a service or resource outside of the container. A response to a function call from the compute function to a service or resource outside the container may be detected by monitoring communications from the external service or resource into the container. If the container agent does determine 418 that the event is an event associated with a response to a previously detected outbound function call from the compute function to a service or resource outside of the container, the container agent may extract data and/or metadata from the event so that a telemetry service may record 420 the response time of the response to the function call. The telemetry service may then compute 422 the elapsed time of the function call by comparing the function call time to the response time. Next, the container agent may then continue 408 to monitor the compute function by monitoring 404 the compute function as described above.

If the container agent detects 406 an event, the container agent may next determine 424 whether the event is a teardown event. A teardown event is an event associated with terminating execution of the compute function in the container. As with a startup event, a teardown event may be generated by a software library associated with the container, by an API call, by an SDK, or by some other such mechanism. If the container agent does determine 424 that the event is a teardown event, the container agent may extract data and/or metadata from the event so that a telemetry service may record 412 the stop time for the compute function. The telemetry service may then compute 428 the total elapsed time for the compute function by comparing the start time with the stop time. The container agent may then continue 408 to monitor the compute function by monitoring 404 the compute function as described above until the teardown event is detected. Finally, the telemetry service may begin 430 to analyze the metrics data and may, in some embodiments, generate reports of the metrics data as described herein.

It should be noted that while the various event detection steps described in the example process 400 illustrated in FIG. 4 are shown in a sequential order, these steps may be performed in any order and may also be performed in parallel. For example, a process of the container agent may detect multiple function calls at the same time, and may also detect several responses to those function calls. A response to a first function call may be received before, during, or after a response to a second function call.

Figure 5:
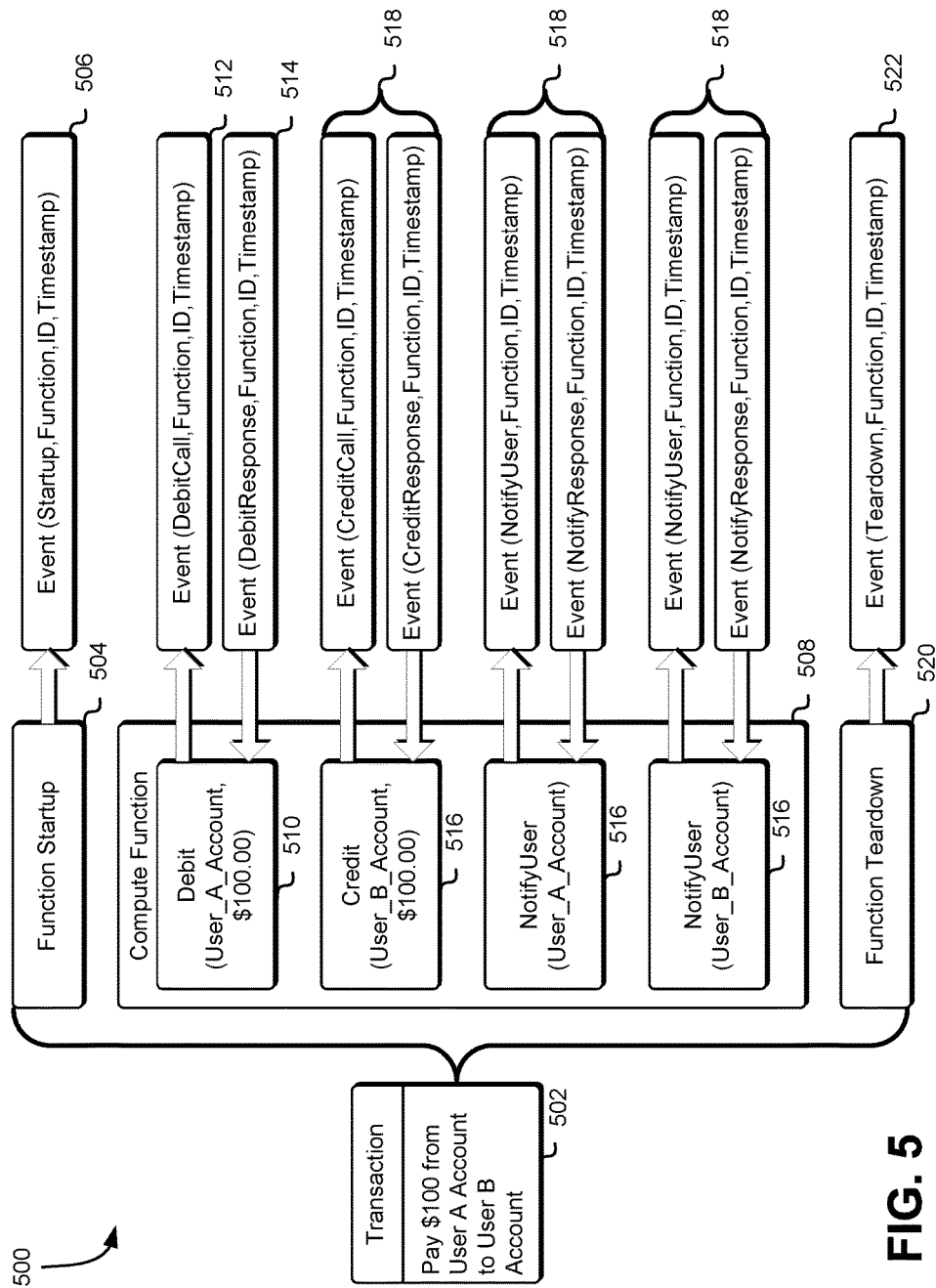
FIG. 5 illustrates an example diagram where events associated with time-based metrics of a stateless compute function are generated.

FIG. 5 illustrates an example diagram 500 where events associated with time-based metrics of a stateless compute function are generated as described in connection with FIG. 1 and in accordance with an embodiment. In the example illustrated in FIG. 5, a transaction 502 to transfer (i.e., to pay) $100 from an account associated with a user "A" to an account associated with a user "B" is implemented as a stateless compute function 508. As described above, one or more steps associated with executing the stateless compute function 508 may generate events. When a notification of an event is received by an agent such as the container agent 208 described in connection with FIG. 2, time-based metrics may be extracted from those events for further analysis.

In the example illustrated in FIG. 5, the function startup call 504 may generate an event 506 specifying the name of the generating action (e.g., "startup"), the compute function name, an ID associated with the compute function, and a time stamp. The time stamp of this event 506 may be compared against a time stamp of a corresponding event 522 generated by the function teardown call 520, when the function teardown call 520 occurs after execution of the compute function 508 completes.

Similarly, the function call 510 to debit the $100 from the account associated with the user "A" may generate a first event 512 corresponding to the function call 510 and a second event 514 corresponding to the response received from that call. These two events may similarly be used to calculate a corresponding elapsed time for the function call 510 to debit the $100 from the account associated with the user "A." Additional function calls 516 (e.g., the calls to credit the account associated with user "B" and/or the calls to notify each user) may generate similar pairs of events 518 that may be used to calculate a corresponding elapsed time for the associated function call of the additional function calls 516.

Figure 6:
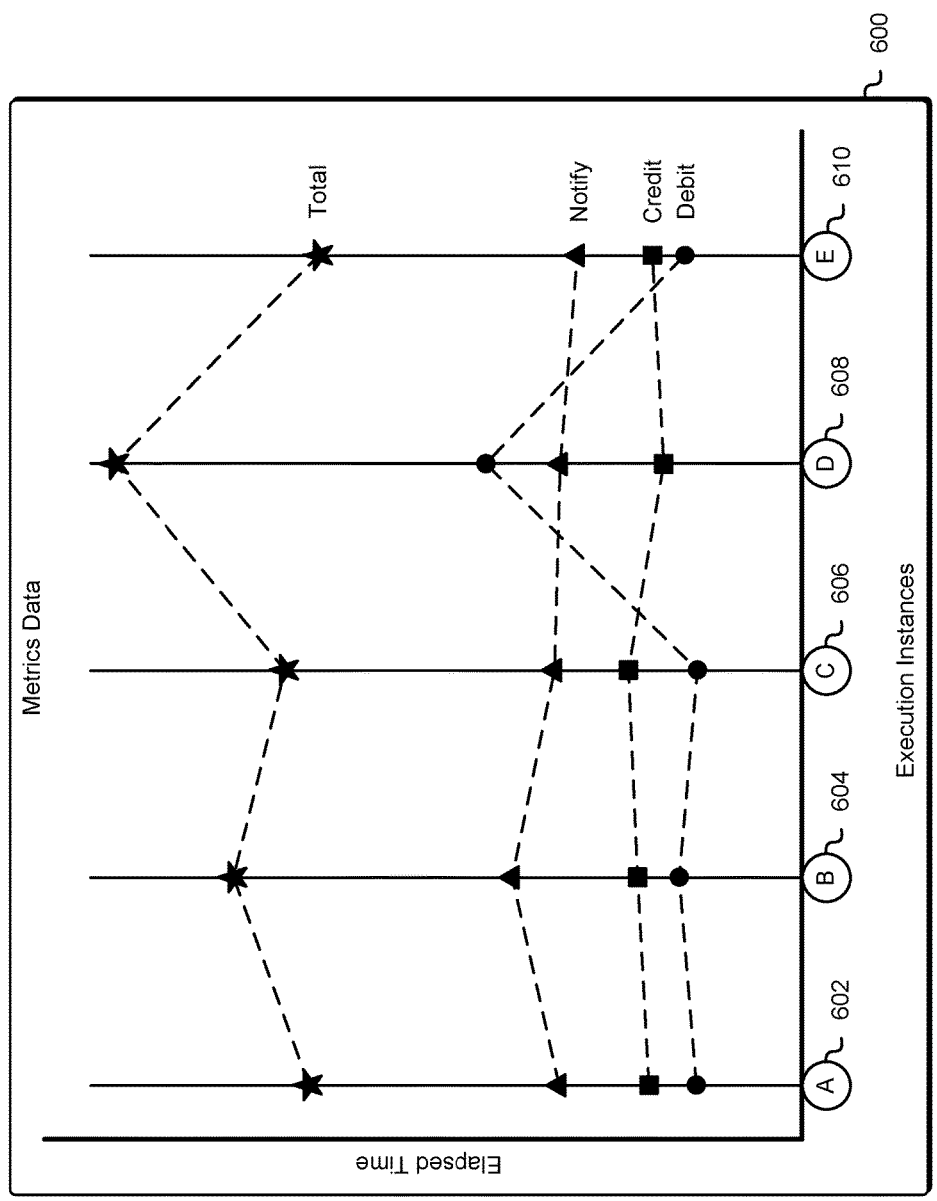
FIG. 6 illustrates an example graph of time-based metrics of a stateless compute function.

FIG. 6 illustrates an example graph 600 of time-based metrics of a stateless compute function as described in connection with FIG. 1 and in accordance with an embodiment. In the example graph 600, five sets of time-based metrics are displayed for the execution of the banking transaction described above. The sets of time-based metrics include the corresponding elapsed time for the debit function call (i.e., the function call to debit the payment amount from the payer account), denoted on the example graph 600 with circles, the corresponding elapsed time for the credit function call (i.e., the function call to credit the payment amount to the payee account), denoted on the example graph 600 with squares, the corresponding elapsed time for the notify function call (i.e., the function call to notify the users of the respective accounts), denoted on the example graph 600 with triangles, and the total elapsed time for the compute function (i.e., the time between starting and tearing down the compute function), denoted on the example graph 600 with five-pointed stars. In the example graph 600, the total elapsed time for each set of time-based metrics corresponds to the sum total of the credit function, the debit function, and the notify function. That is, any additional time such as, for example, the time between the functions being executed is considered negligible.

In the first set of time-based metrics 602, the third set of time-based metrics 606, and the fifth set of time-based metrics 610, the debit time, the credit time, and the notify time are approximately the same (e.g., they do not vary significantly) and, accordingly the total time for each of the first set of time-based metrics 602, the third set of time-based metrics 606, and the fifth set of time-based metrics 610 is relatively constant. The example graph 600 shows a slight decrease in the notify time for the fifth set of time-based metrics 610 and a corresponding decrease in the total time for the fifth set of time-based metrics 610, but such a decrease may be considered as within acceptable threshold values.

Conversely, the second set of time-based metrics 604 and the fourth set of time-based metrics 608 show larger variations as illustrated by the example graph 600. For example, the second set of time-based metrics 604 shows an elevated total time as compared to the first set of time-based metrics 602, the third set of time-based metrics 606, and the fifth set of time-based metrics 610. This increase in the total time of the second set of time-based metrics 604 is, in the example illustrated in FIG. 6, due to an increase in the notify time and a slight increase in the debit time. In analyzing this particular set of time-based metrics, it may be determined that, while the total time may be greater than acceptable threshold values, each of the corresponding elapsed times for the debit function call and/or the notify function call may be within acceptable threshold values. In another example, the fourth set of time-based metrics 608 shows a significant increase in the debit time and a corresponding increase in the total time as illustrated in the example graph 600. This significant increase in the debit time may warrant further analysis by a user, particularly if such an increase continues for multiple execution instances.

Figure 7:
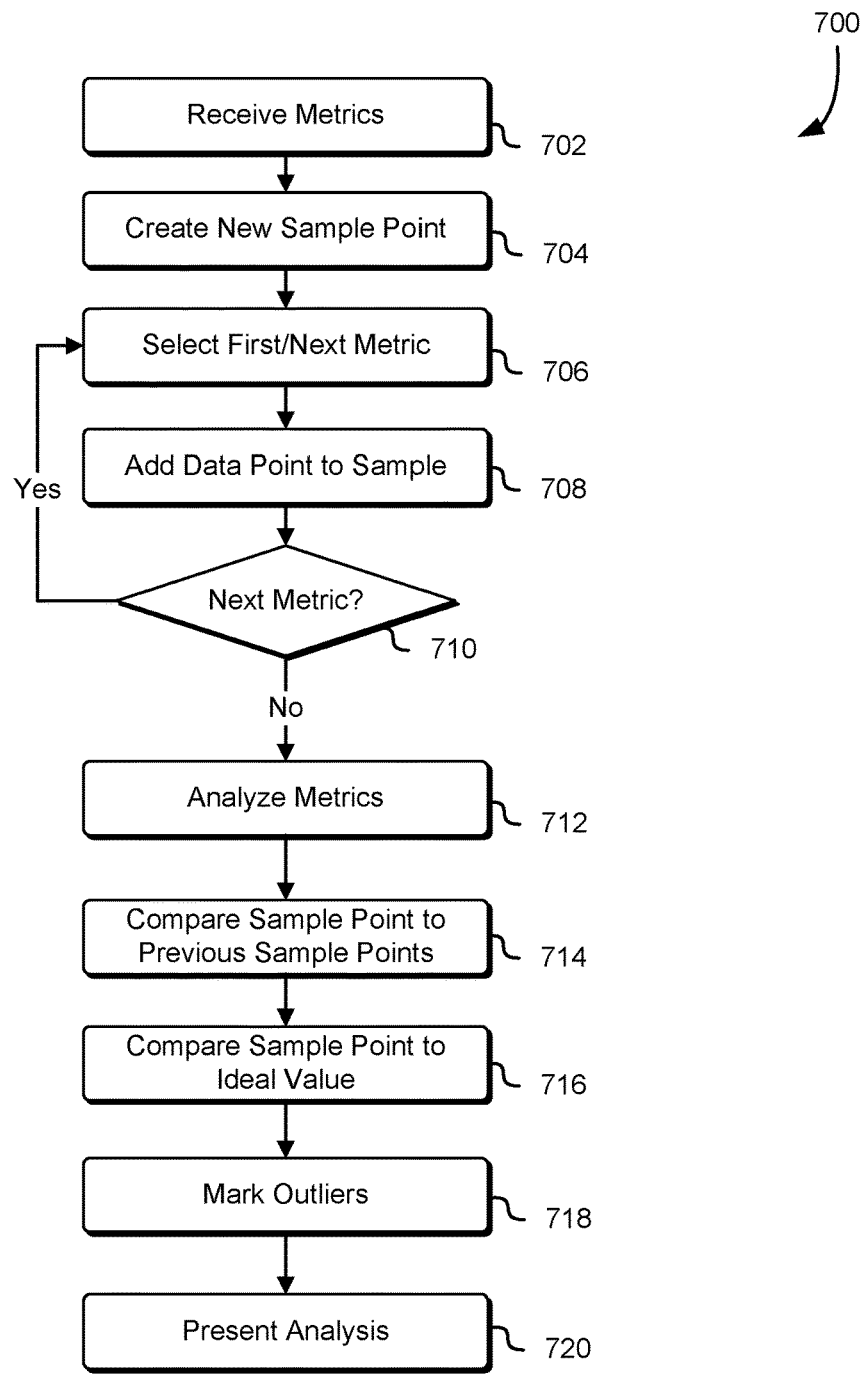
FIG. 7 illustrates an example process for generating and analyzing data points for time-based metrics of a stateless compute function.

FIG. 7 illustrates an example process 700 for generating and analyzing data points for time-based metrics of a stateless compute function as described in connection with FIG. 1 and in accordance with an embodiment. A telemetry service such as the telemetry service 120 described in connection with FIG. 1 may perform the process illustrated in FIG. 7. The telemetry service may first receive 702 a set of metrics from the execution of a compute function. The metrics may include elapsed times associated with the compute function (i.e., be time-based metrics) or may include metrics including, but not limited to, an amount of processor time, an amount of memory usage, an amount of storage, or an amount of network bandwidth. As a result of receiving the set of metrics, the telemetry service may then create 704 a new sample point and then select 706 each metric in the set of metrics, adding 708 a new data point corresponding to the selected metric to the sample while there are still remaining metrics 710.

After all data points corresponding to the metrics in the set of metrics have been added, the telemetry service may next analyze 712 the metrics by, for example, comparing 714 the sample point to previously measured sample points to determine whether the sample point differs greatly from the previous sample points (i.e., if the sample point differs from the average of a plurality of previously measured performance metrics by more than a threshold value). For example, if the metrics are time-based metrics, the sample point, which may be a time value or an elapsed time value, may be compared against an expected time, calculated based at least in part on an average of one or more previously measured sample points.

In an embodiment, the telemetry agent will compare the sample point to an average of a plurality of previously measured sample points by maintaining an average of those previously measured sample points and comparing the sample point to that average. In another embodiment, the telemetry agent will set an ideal value based on a percentile of the average value. So, for example, any sample point that is more than 99% ("percent") of the average value, or 90% of the average value, or some other percentile of the average value. In another embodiment, the telemetry agent will perform one or more statistical analyses of the previously measured sample points prior to comparing 714 the sample point to the previously measured sample points to determine whether the sample point differs greatly from the previous sample points. Such statistical analyses may include, but may not be limited to, determining the median, determining the standard deviation, determining a characteristic function, or performing one or more other such statistical analysis.

Similarly, the telemetry service may analyze 712 the metrics by, for example, comparing 716 the sample point to a theoretical or desired ideal value to determine whether the sample point differs greatly from that ideal value (i.e., if the sample point metric differs from the ideal by more than a threshold value). As used herein, an ideal value is a value representing an ideal or desired level of performance for the compute function. For example, the banking transaction described above may be intended to be a real-time transaction such that each transaction completes in under 150 ms. In this example, the ideal value would be 150 ms, and the threshold value would be 25 ms (i.e., a sample point metric for the total execution time that exceeds 175 ms would differ from the ideal value by more than the threshold value). Finally, the telemetry service may mark 718 any outlier values based on the analysis and may present the analysis as described above.

Figure 8:
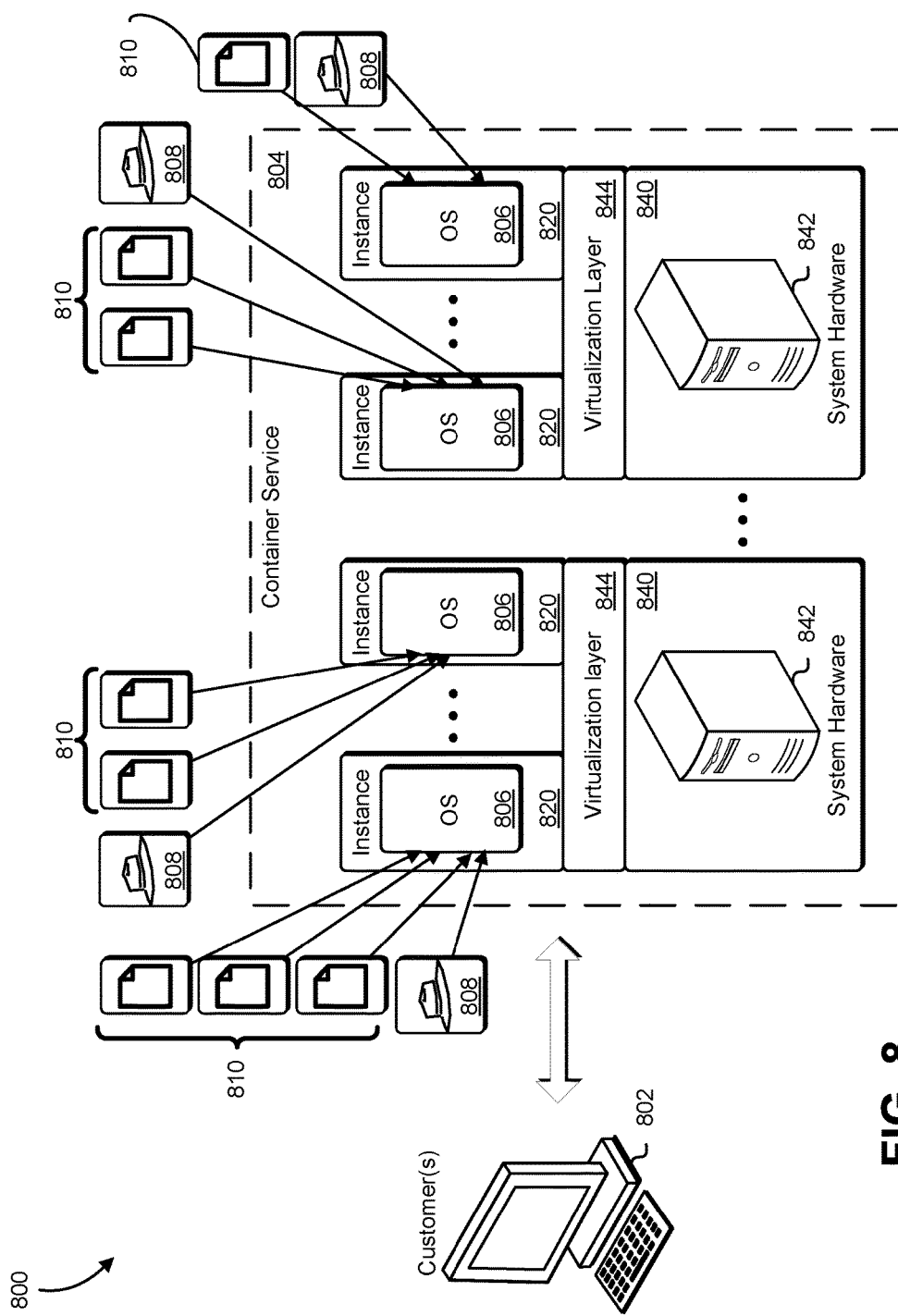
FIG. 8 illustrates an example where a container service is virtualized.

FIG. 8 illustrates an example environment 800 where a container service is virtualized in accordance with an embodiment. The container service 804 illustrated in FIG. 8 is a container service such as the container service 110 described in connection with FIG. 1 that is associated with instances designated for hosting a stateless compute function as described above. The container service 804 is configured to execute a plurality of virtual machines configured as container instances 820 in accordance with at least one embodiment. The container service 804 may provide system hardware 840 to customers 802 of a computing resource service provider such as the computing resource service provider 112 described in connection with FIG. 1, providing the container service 804 to perform computation services within containers 810. The system hardware 840 may include one or more hosts 842, also referred to as host computer systems. Each of the hosts 842 may be any device or equipment configured to execute instructions for performing data computation, manipulation, or storage tasks, such as a computer or a server. The hosts 842 may be equipped with any needed processing capability, including one or more processors, such as a central processing unit, a graphics processing unit, or a digital signal processor. The hosts 842 may also be equipped with memory (e.g., static and dynamic memory), buses, and input and output ports that are compliant with any handshaking, communications or data transfer protocol. The system hardware 840 may also include storage devices, such as storage disks and tapes, and networking equipment. The storage devices may be network storage devices managed by a data storage service, such as a block-level data storage service.

As used herein, a block-level data storage service may comprise one or more computing resources that collectively operate to store data for a user or customer using block-level storage devices (and/or virtualizations thereof). The block-level storage devices of the block-level data storage service may, for instance, be operationally attached to virtual computer systems provided by a virtual computer system service to serve as logical units (e.g., virtual drives) for the computer systems. A block-level storage device may enable the persistent storage of data used/generated by a corresponding virtual computer system where the virtual computer system service may only provide ephemeral data storage.

Virtualization layers 844 in the system hardware 840 enables the system hardware 840 to be used to provide computational resources upon which one or more container instances 820 may operate. The virtualization layer 844 may be any device, software, or firmware used for providing a virtual computing platform for the container instances 820. The virtualization layers 844 executing on the hosts 842 enables the set of system hardware 840 to be used to provide computational resources necessary to support the container instances 820. Furthermore, one or more physical hosts of the hosts 842 may host multiple virtualization layers of the same or different types on the system hardware 840, which may be the same system hardware. Each container instance 820 may include various virtual computer components, such as one or more virtual processors, virtual memory, and virtual storage. The container instances 820 may be provided to the customers of the computing resource service provider and the customers may run an operating system 806 and applications on each of the container instances 820. An example of a virtualization layer 844 includes a hypervisor.

Requests may be received by a request interface provided by the computing resource service provider. An example of a request interface is a front-end service, which may be configured to receive requests from customers and/or to forward those requests to the appropriate services such as those described above. A customer may launch one or more sets of container instances and then manage user and application isolation within each set of container instances through the front-end service. For example, the customer may specify that "instances 1-10" should comprise a first set of instances and "instances 11-15" should comprise a second set of instances. Thereafter, when the customer submits a launch request for a container, the customer may specify whether the container should be launched in the first set or the second set.

The request interface 814 may then direct the request to the appropriate container instance. Each container instance 820 may include one or more agents 808. The agents 808 may be configured to allow the customers 802 to manage their respective container of the containers 810 and container instances. The agents 808 may be further configured to perform logging of events and gather telemetry data related to the containers 810 and container instances 820. The agents 808 may be agents such as a container agent as described above.

The operating systems 806 may be any operating systems suitable for running within the container instances 820 and that provide isolation technology that enable containerization schemes to isolate virtualization instances, such as the containers 810, from other processes running under the operating system 806. Examples of such operating systems include various implementations of Linux operating systems that support resource isolation features in the Linux kernel. As noted, the containers 810 may be virtualized instances within the operating systems 806 launched from application images in accordance with one or more task definitions, and may be allocated resources from their respective container instance of the container instances 820.

Figure 9:
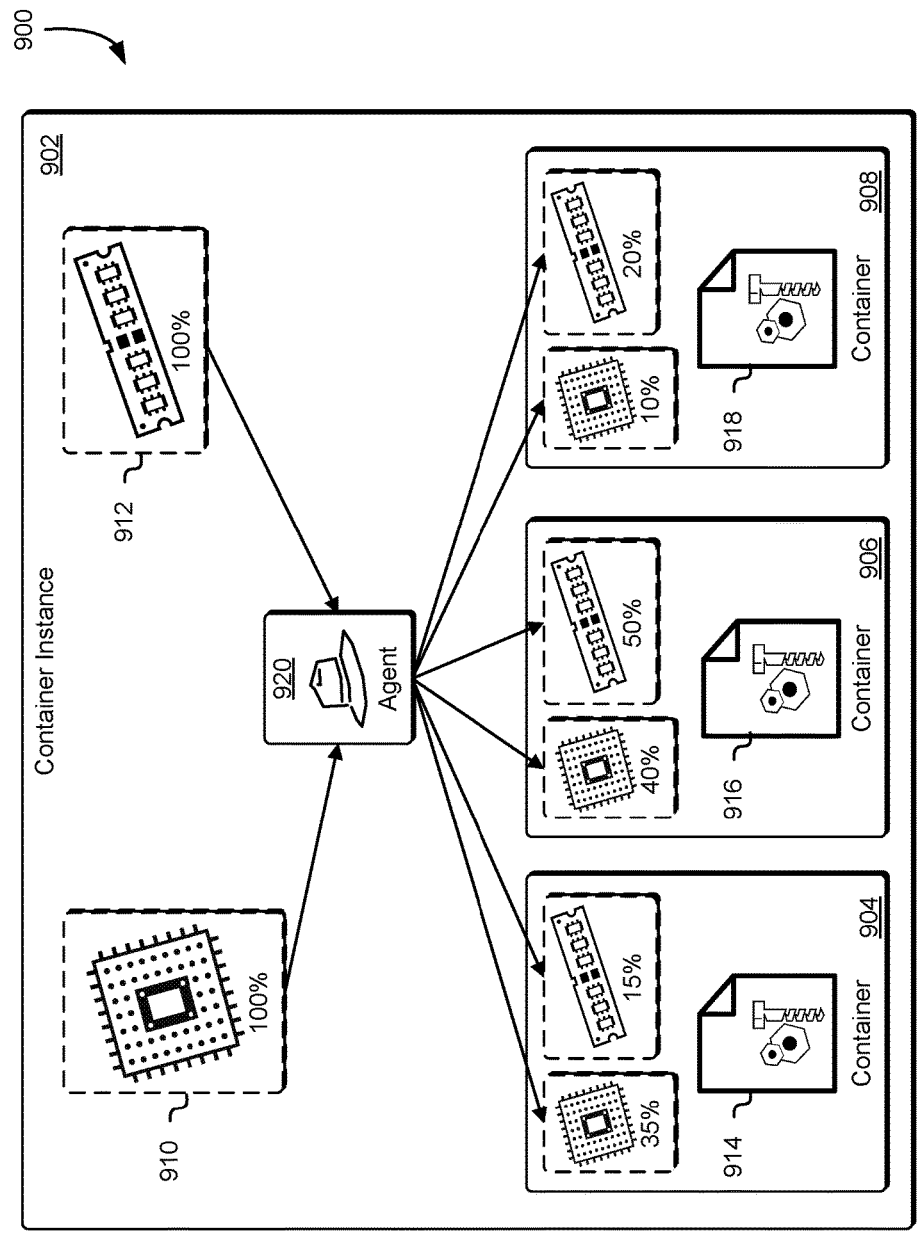
FIG. 9 illustrates an example environment where resources are allocated between a container instance and containers within the container instance.

FIG. 9 illustrates an example environment 900 where resources are allocated between a container instance 902 and containers within the container instance. The containers illustrated in FIG. 9 are containers such as the container 204 hosted by the container instance 202, both as described in connection with FIG. 2. The containers are containers that are associated with instances designated for hosting a stateless compute function as described above. The container instance 1102 may be a computer system instance (virtual or non-virtual) configured to support container instances (i.e., configured to support containerization). The container instance 902 is depicted with an allocated amount of processing resources 910 and an amount of memory resource 912. Each of the containers may be launched within the container instance 902 from a software image and allocated an amount of resources from the pool of resources of the container instance 902, such as the processing resources 910 and the memory resources 912. As shown, the container 904 has been allocated 35% of the processing resources 910 and 15% of the memory resources 912 of the container instance 902 in order to run its processes 914 such as, for example, the compute function 210 described in connection with FIG. 2. Similarly, the container 906 has been allocated 40% of the processing resources 910 and 50% of the memory resources 912 of the container instance 902 in order to run its processes 916 such as, for example, the compute function 210 described in connection with FIG. 2. Likewise, the container 908 has been allocated 9% of the processing resources 910 and 20% of the memory resources 912 of the container instance 902 in order to run its processes 918 such as, for example, the compute function 210 described in connection with FIG. 2. In sum, 85% of the processing resources 910 and 85% of the memory resources 912 of the container instance 902 have been allocated to container 904, container 906, and container 908.

The container instance may include a container agent 920. The container agent 920 may be a separate running container configured to interface between the containers in the container instance 902 as well as entities external to the container instance 902. The amount of resources to be allocated to the containers may be specified within a function definition. A scheduler may determine the container instance 902 within which to launch the containers based on, for example, a placement scheme and/or designation of available resources within a set of container instances of which the container instance 902 is a member.

As used herein, a scheduler is a service configured to launch tasks within the described set of container instances. The scheduler may be provided by the computing resource service provider. Alternatively, a customer may implement their own scheduler, rather than the scheduler provided by the computing resource service provider. The scheduler may use one or more application programming interface calls in conjunction with the placement logic of the customer scheduler to make placement decisions for scheduled tasks. The customer may also design and/or upload a placement algorithm to be used by the customer's scheduler, or may select from a list of possible placement algorithms provided to the customer by the computing resource service provider. A container service (as described above) may determine, based on available resources, whether to accept or reject placement decisions made by the customer scheduler.

The scheduler may schedule tasks based at least in part on security rules, security groups, and/or security roles, have affinity, and anti-affinity. For example, tasks within a certain security group may be configured to be launched on the same container instance whenever possible or practicable, or, conversely, may be scheduled to be launched in separate container instances. As another example, tasks may be assigned to certain security groups or designated to have certain security roles, and, based on the particular security group assigned or security role designated, a task may be assigned to run in a specific set of instances or specific instances or may have priority for resources over other tasks. Task distribution based on affinity/anti-affinity may include assigning "tags" indicating relationships between containers, container instances, and tasks.

After the scheduler determines the container instance 902 within which to launch the containers, the scheduler may then notify the container instance 902 or the container agent 920, to allocate the amount of resources specified by the function definition to the containers such as container 904, the container 906, or the container 908. The container agent 920 may then allocate the resources to the containers as directed by the scheduler. Additionally, once the resources are allocated for each of the containers, the scheduler may notify the container instance 902 or the container agent 920 to launch each of the containers as running containers (i.e., instances with associated compute functions) within their own namespace and with exclusive use of their respectively allocated resources. Upon being so notified, the container agent 920 may launch the containers within the container instance 902 as directed by the scheduler.

Figure 10:
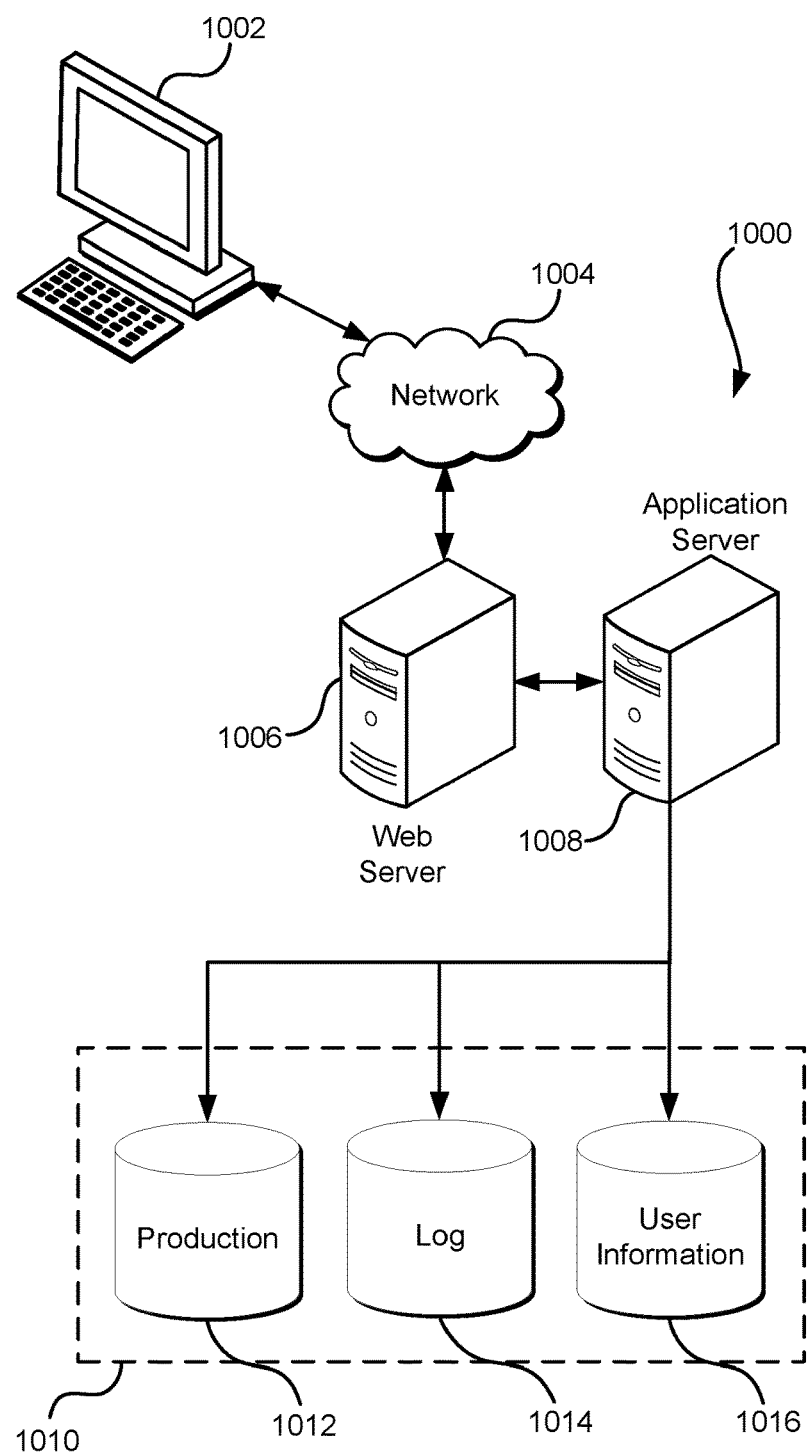
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    instantiating a stateless compute function in a container, the container hosted in a container instance that provides a virtualization layer for a set of computing resources associated with a host computer system, the container instance configured to provide access to the container;
    monitoring the stateless compute function using a container agent operating on the container instance by causing the container agent to monitor outbound communications from the container;
    recording a first time value as a result of intercepting an outbound function call in the outbound communications;
    recording a second time value as a result of intercepting a response to the outbound function call;
    calculating an elapsed time for the outbound function call based at least in part on comparing the second time value to the first time value;
    generating a performance metric for the outbound function call based at least in part on the elapsed time;
    comparing the performance metric to an expected time value associated with the compute function; and
    providing information that indicates a result of comparing the performance metric to the expected time value.

2. The computer-implemented method of claim 1, wherein the expected value is an average value calculated based at least in part on one or more previously measured performance metrics.

3. The computer-implemented method of claim 2, wherein the expected value is a percentile of the average value.

4. The computer-implemented method of claim 1, wherein the expected value is an ideal value.

5. The computer-implemented method of claim 1, wherein the response to the outbound function call includes at least one of: an indicator of success, an indicator of failure, an error, or a result of the outbound function call.

6. A system, comprising one or more processors and memory storing executable instructions that, as a result of execution by the one or more processors, cause the system to:
    monitor a compute function running on a computer system using an agent running on the computer system, the agent configured to intercept outbound function calls from the compute function;
    intercept an outbound function call calling for a computing system entity to perform a function;
    intercept a response to the outbound function call;
    calculate a performance metric based on the outbound function call and the response;
    aggregate the performance metric for the outbound function call into a set of performance metrics for the compute function; and
    provide a graph of at least a subset of the set of performance metrics for the compute function.

7. The system of claim 6, wherein the compute function is a stateless compute function.

8. The system of claim 6, wherein the computer system is a container instance.

9. The system of claim 8, wherein the agent is a container agent.

10. The system of claim 8, wherein the compute function is instantiated in a container hosted by the container instance.

11. The system of claim 6, wherein the performance metric for the outbound function call is a time-based metric, the time-based metric calculated based at least in part on calculating an elapsed time associated with the outbound function call.

12. The system of claim 6, wherein the performance metric for the outbound function call is at least one of: an amount of processor time used while executing the outbound function call, an amount of memory used while executing the outbound function call, an amount of storage used while executing the outbound function call, or an amount of network bandwidth used while executing the outbound function call.

13. A set of one or more non-transitory computer-readable storage media having stored thereon executable instructions that, as a result of being executed by one or more processors of a computer system, cause the computer system to:
    instantiate a computer program on the computer system using an application programming interface;
    intercept one or more outbound function calls from the computer program, the one or more outbound function calls calling for a computing system entity to perform a function;
    intercept one or more responses corresponding to the one or more outbound function calls;
    calculate a corresponding elapsed time between each outbound function call of the one or more outbound function calls and the response of the one or more responses that corresponds to the outbound function call;
    provide the corresponding elapsed time to a service; and
    using the service, generate a set of performance metrics for the computer program.

14. The set of one or more non-transitory computer-readable storage media of claim 13, wherein the computer program is a stateless compute function.

15. The set of one or more non-transitory computer-readable storage media of claim 13, wherein the instructions that cause the computer system to intercept the one or more outbound function calls further comprise instructions that, as a result of being executed by the one or more processors, cause the computer system to intercept the outbound function calls using an agent operating on the computer system.

16. The set of one or more non-transitory computer-readable storage media of claim 13, wherein the instructions that cause the computer system to intercept the one or more outbound function calls further comprise instructions that, as a result of being executed by the one or more processors, cause the computer system to intercept the outbound function calls by adding monitoring functionality to the application programming interface.

17. The set of one or more non-transitory computer-readable storage media of claim 13, wherein:
    the one or more outbound function calls at least includes a function startup call; and
    the corresponding elapsed time for the function startup call is calculated based at least in part on receiving a function teardown call.

18. The set of one or more non-transitory computer-readable storage media of claim 13, wherein the computer system is a virtual machine instance.

19. The set of one or more non-transitory computer-readable storage media of claim 13, wherein the computer system is a container instance.

20. The set of one or more non-transitory computer-readable storage media of claim 19, wherein the instructions that cause the computer system to intercept the one or more outbound function calls further comprise instructions that, as a result of being executed by the one or more processors, cause the computer system to intercept the outbound function calls using an container agent operating on the container instance.

* * * * *